United States Patent
Pollehn et al.

(10) Patent No.: US 7,431,120 B2
(45) Date of Patent: Oct. 7, 2008

(54) OPERATING METHOD FOR VEHICLES

(75) Inventors: Dietger Pollehn, Munich (DE);
Maximilian Fuchs, Munich (DE);
Danny Borke, Gammelsdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/502,452

(22) Filed: Aug. 11, 2006

(65) Prior Publication Data

US 2007/0007067 A1 Jan. 11, 2007

Related U.S. Application Data

(63) Continuation of application No. PCT/EP2004/013822, filed on Dec. 4, 2004.

(30) Foreign Application Priority Data

Feb. 12, 2004 (DE) .................. 10 2004 006 910

(51) Int. Cl.
*B60K 28/00* (2006.01)
(52) U.S. Cl. .................................... 180/272
(58) Field of Classification Search ........... 180/272, 180/271; 340/439, 438, 576; 701/1, 29
See application file for complete search history.

(56) References Cited

U.S. PATENT DOCUMENTS

| | | | |
|---|---|---|---|
| 5,071,621 A | 12/1991 | Tokuhiro et al. | |
| 6,734,799 B2 * | 5/2004 | Munch | 340/576 |
| 2002/0121981 A1 | 9/2002 | Munch | |
| 2002/0140215 A1 * | 10/2002 | Breed et al. | 280/735 |
| 2003/0218544 A1 * | 11/2003 | Shinada | 340/575 |
| 2005/0143884 A1 | 6/2005 | Bihler et al. | |

FOREIGN PATENT DOCUMENTS

| | | |
|---|---|---|
| DE | 195 45 848 A1 | 6/1997 |
| DE | 197 02 748 A1 | 9/1997 |
| DE | 201 19 203 U1 | 4/2002 |
| DE | 100 60 736 A1 | 6/2002 |
| DE | 101 52 852 A1 | 5/2003 |
| DE | 103 07 556 A1 | 9/2004 |
| EP | 0 878 356 A1 | 11/1998 |
| JP | 1-186423 A | 7/1989 |
| JP | 7-108848 A | 4/1995 |
| WO | WO 02/36391 A1 | 5/2002 |
| WO | WO 03/039914 A1 | 5/2003 |

* cited by examiner

*Primary Examiner*—Christopher Ellis
*Assistant Examiner*—Robert A. Coker
(74) *Attorney, Agent, or Firm*—Crowell & Moring LLP

(57) ABSTRACT

A method for operating vehicles, with which the state of the driver's health is determined and a corresponding signal is sent, provides continuously activatable systems in the vehicle, and thus the physical state of the driver and the other passengers is positively influenced and/or any stress that arises is counteracted.

22 Claims, 2 Drawing Sheets

OPERATING METHOD FOR VEHICLES

CROSS REFERENCE TO RELATED APPLICATIONS

Figure 1:
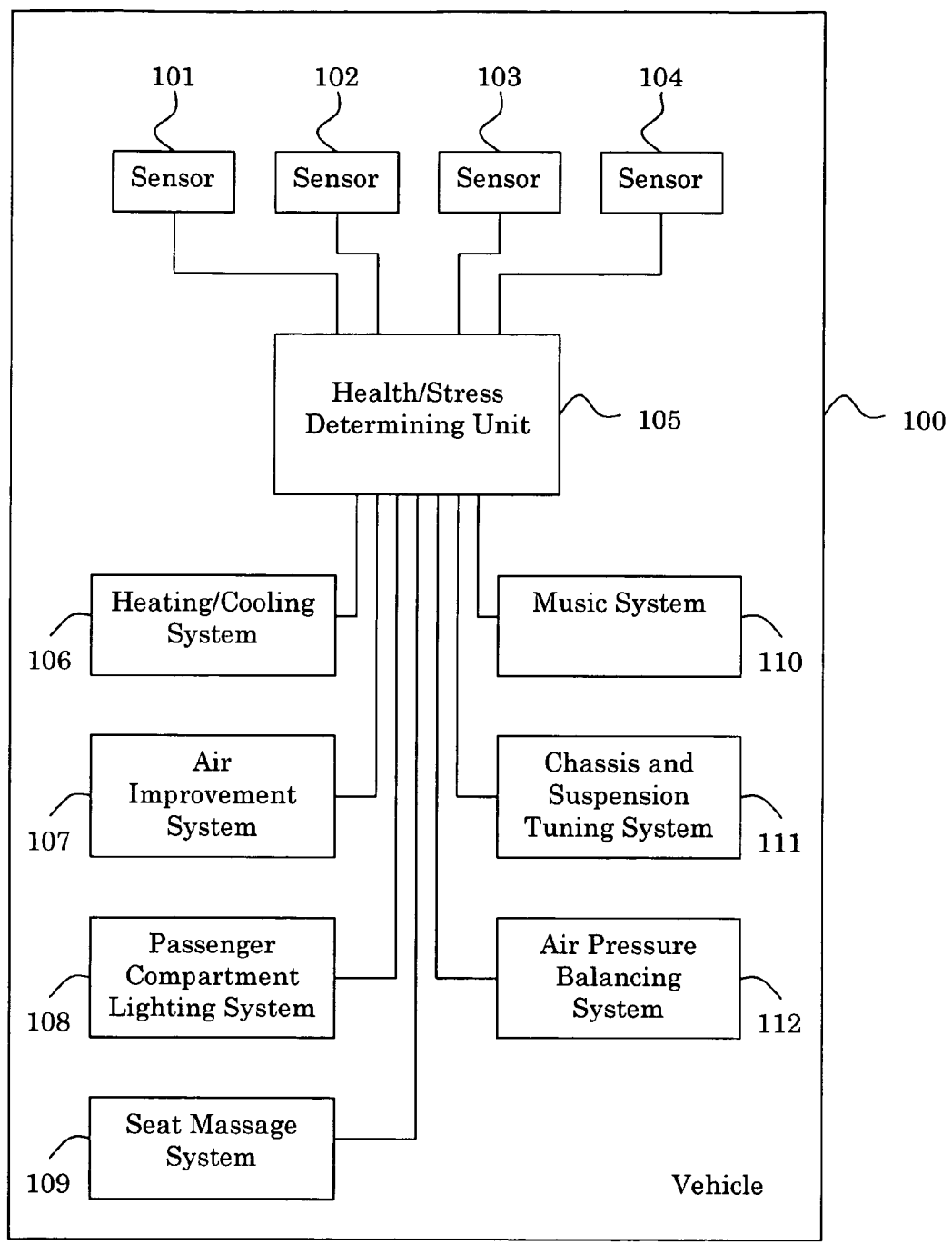

This application is a continuation of PCT International Application No. PCT/EP2004/013822, filed Dec. 4, 2004, which claims priority under 35 U.S.C. § 119 to German Patent Application No. 10 2004 006 910.7, filed Feb. 12, 2004, the entire disclosures of which are herein expressly incorporated by reference.

BACKGROUND AND SUMMARY OF THE INVENTION

The invention relates to a method for operating vehicles, with which the state of the driver's health is determined and a corresponding signal is sent. A contactless sensor technology may be used to determine the state of the driver's health.

Such a method is known from U.S. Pat. No. 2002/0121981 A1. According to this method, both the basic information about the state of health, like the body temperature and the resting pulse rate, as well as temporary information, like raised pulse rate and eye blink frequency, are obtained. The latter allows conclusions to be drawn about the fatigue of the vehicle user. These data are transferred outside to an external expert, who in turn is supposed to draw the driver's attention to the fact, for example, that he ought to change his driving behavior. It is also possible to point out to the driver a critical state of health by evaluation electronics that are provided in the vehicle itself.

In this context, the method disclosed in EP 0 878 356 B is also important. In the event of a severe accident, passive safety systems, such as airbags and the like, are controlled as a function of the physical fitness of the passengers.

DE 103 07 556.9, which has not been previously published, deals with the problem of analyzing and having, if possible, a positive impact on the state of the passenger's health in the event of an accident and/or preventing additional injury, which would be otherwise caused, for example, due to an increase in the temperature in the passenger compartment by, for example, switching off the heating system.

The goal of all of these methods together is not to make the injury-related situation even worse and/or to prevent the occurrence of injury. Their focus is clearly the deficient state of the vehicle occupants' health.

The invention is based on the problem of providing a method of the type noted in the introduction of the specification so as to have a positive impact on the driver and the vehicle passengers.

The invention solves this problem.

With the aid of the systems disclosed in detail below, the physical and mental state of the vehicle occupants is influenced in a positive manner. Therefore, the attempt is made with the aid of these systems to improve the state of the passenger's health and thus to improve indirectly also the emotional state of the passenger, or to have a direct positive impact on the mental health.

These systems are, as a general rule, those systems which are present in the vehicle in any event. The common feature of all of these systems is that their effect focuses on the passenger and that these systems influence as positively as possible the state of the passenger's health. In contrast to the aforementioned known or earlier patent documents, however, one should not just wait until there is a definite and clear deterioration in the passenger's state of health and/or ability to drive. Rather, an aspect of the present invention is to continuously improve the physical and mental health of the passengers during a trip. Furthermore, the method is not just aimed at the driver, but also at all of the other passengers.

These systems comprise in detail:

a) a heating/cooling system for temperature adjustment or stabilization in the passenger compartment, in order to create for the passengers a climate in the compartment that is as comfortable as possible, b) a passenger compartment air improvement system to enrich the air in the passenger compartment with health-enhancing fragrant substances analogous to a so-called aromatherapy and/or for neutralizing poisonous or harmful substances, c) a seat massage system in order to activate physically the passenger, for example, in the event of a prolonged and usually fatiguing trip, d) a music system that reproduces pleasing melodies in order to put the passengers and the driver in a positive mood, e) a chassis and suspension tuning system, with which the passenger's perception of comfort may be raised, f) an air pressure balancing system in order to counteract pressure fluctuations, as is the case during a mountain trip, and/or g) a passenger compartment lighting system, which enhances the feeling of well-being with warming red light or refreshing bright light.

The information about the passenger's well-being and state of health may be obtained indirectly from the analysis of the traffic situation and the events during the trip. The necessary sensor technology for this analysis is normally already present and is employed for the purpose of sending information about the traffic situation, the road condition and the handling behavior of the vehicle to other traffic participants or a central office. The applicant carries out such analyses under the name "connected drive."

Within the scope of the invention, the existing data are used to draw conclusions about the physical and mental stress on the passengers. If, for example, the data show that in the event of high traffic density and a critical road condition the vehicle is moving at a speed that is not slow or in the event of vehicles coming up behind at a high vehicle speed, the obvious conclusion is an especially stressful situation.

In addition to or as an alternative, the noise level prevailing outside the vehicle and/or the acoustical behavior of the passengers and of the driver himself may also be recorded with a microphone and analyzed. Externally audible honking noises or loud conversations lead to the conclusion that the vehicle occupants are under especially high mental stress.

The information about the passengers's state of health may be obtained even from the respective passenger himself. The information may be obtained from a contactless system. From this information the respective degree of comfort that the passenger perceives may be directly inferred. To this end it may be advantageous to determine the passenger's state of health during a trip, and in particular, at the start of the trip. If the passenger is invariably attentive and shows no signs of fatigue or other health-related anomalies, like a high body temperature, the obvious assumption is good health and personal well-being.

If, in contrast, the passenger shows increasing signs of stress in his movements, in the case of the driver, for example, in his steering behavior, or signs of fatigue in the form of delayed reactions or higher frequency of eye blinking, it must be assumed that the feeling of well-being has also decreased. At that stage it is logical to employ some or all of the above-described systems together in order to raise again the feeling of well-being.

Even atmospheric influences, an approaching thunderstorm for example, may be detected with suitable sensor technology in the vehicle. A barometer, for example, or the data transmission of a weather service or other vehicles may be detected. Their influence on the state of the vehicle occupants' health may be considered by means of a corresponding reaction of the vehicle's own systems, like an audio system for producing soothing music.

A health and behavior profile may be kept for each passenger that is characteristic of their respective subjective well-being. These profiles may be obtained, for example, with the aid of several trips in the past. A prerequisite for these profiles is a clear identification of the passenger and assignment of his behavior characteristics. This identification may be carried out, as is well-known, with optics using image processing techniques or by means of biometric data, like a fingerprint, a voice print, and the retina structure, which are determined with suitable bio-sensor technology.

In this context, the health and behavior profile for the respective user may also be manually parameterizable by means of a suitable configuration tool. Thus, for example, every individual ought to be able to block the systems, noted in the introduction of the specification, or limit the scope of the effect of said systems in order to be able to adapt the systems to the individual physiology of the user.

To the extent it is compatible with the needs and requirements of other vehicle users, the systems shall be individually configurable, and an individual configuration may be modified at any time. In this way the strain and stress is removed from the vehicle user during the trip, and a significant contribution to increasing traffic safety is made.

Other objects, advantages and novel features of the present invention will become apparent from the following detailed description of the invention when considered in conjunction with the accompanying drawings.

BRIEF DESCRIPTION OF THE DRAWING FIGURES

Figure 2:
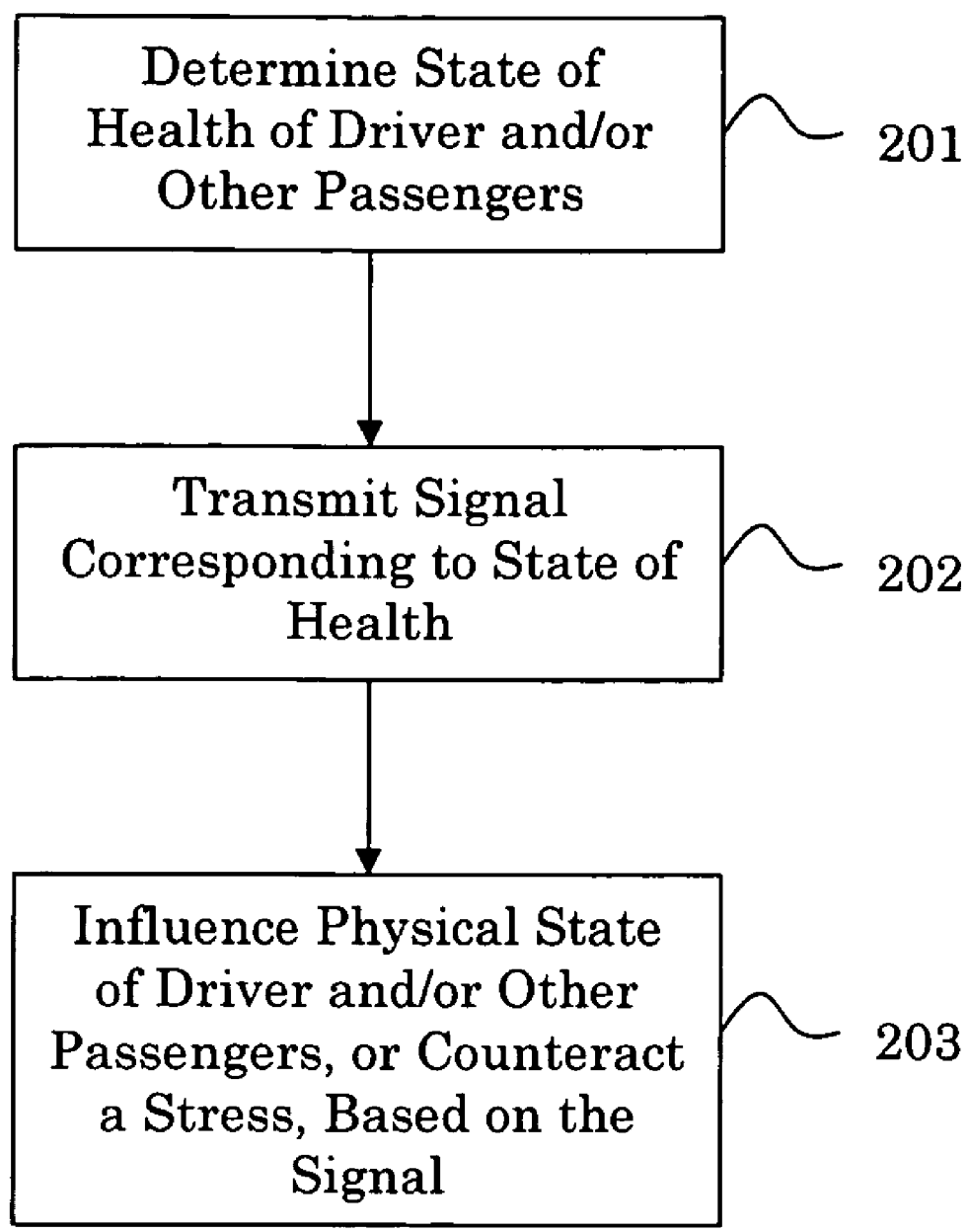

FIG. 1 illustrates an exemplary embodiment of a system in accordance with the present invention; and FIG. 2 illustrates an exemplary embodiment of a method in accordance with the present invention.

DETAILED DESCRIPTION OF THE DRAWINGS

FIG. 1 illustrates an exemplary embodiment of a system in accordance with the present invention. The illustrated embodiment includes a vehicle 100. In the vehicle 100, a plurality of sensors 101-104 may be used to sense a variety of data related to the driver and other passengers, as well as the driving conditions, e.g., traffic. The system may include any number of sensors, and the sensors may be of a contactless type. Signals output from the sensors 101-104 are received by a health/stress determining unit 105, which is configured to determine a state of health of, and/or a stress on, the driver or other passengers, based upon one or more of the sensor signals. A plurality of systems (i.e., heating/cooling system 106, air improvement system 107, passenger compartment lighting system 108, seat massage system 109, music system 110, chassis and suspension tuning system 111 and air pressure balancing system 112) may be used to modify the conditions affecting driver and other passengers, as described above. The above-listed systems are merely exemplary, as other systems may alternatively or additionally be used.

FIG. 2 illustrates an exemplary embodiment of a method in accordance with the present invention. As illustrated, the method includes a step 201 of determining a state of health of a driver and/or other passengers, which may be performed in the health/stress determining unit 105. In step 202, a signal corresponding to the state of health of the driver and/or other passengers may be transmitted from the health/stress determining unit 105 to one or more of the systems 106-112. A physical state of the driver and/or other passengers may be influenced, or a stress on the driver and/or other passengers may be counteracted, based on the transmitted signal, in step 203. The state of health of the driver and/or other passengers, the systems used to influence the physical state thereof, and counteracting a stress are further described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a vehicle, comprising the acts of:
determining a state of health of at least one vehicle occupant;
prior to determining a critical state of health of the at least one vehicle occupant that requires a warning or an intervention by a safety device, determining adjustments to at least one continuously activatable system in the vehicle, based on the state of health of the at least one vehicle occupant;
transmitting a signal, corresponding to the determined adjustments, to the at least one continuously activatable system in the vehicle; and
positively influencing a physical state of, or counteracting a detected stress on, the at least one vehicle occupant with the at least one continuously activatable system in the vehicle, based on the transmitted signal.

2. The method as claimed in claim 1, wherein the state of health of the at least one vehicle occupant is determined contactlessly.

3. The method as claimed in claim 2, wherein an actual physical state of the at least one vehicle occupant is determined by bio-sensor technology.

4. The method as claimed in claim 1, wherein an actual physical state of the at least one vehicle occupant is derived from events occurring during the trip or a current or preceding traffic situation.

5. The method as claimed in claim 1, wherein an actual physical state of the at least one vehicle occupant is derived from acoustic behavior.

6. The method as claimed in claim 1, wherein a scope or nature of an activation of the at least one continuously activatable system is individually set by respective vehicle users.

7. The method as claimed in claim 2, wherein an actual physical state of the at least one vehicle occupant is derived from events occurring during the trip or a current or preceding traffic situation.

8. The method as claimed in claim 3, wherein the actual physical state of the at least one vehicle occupant is derived from events occurring during the trip or a current or preceding traffic situation.

9. The method as claimed in claim 2, wherein an actual physical state of the at least one vehicle occupant is derived from acoustic behavior.

10. The method as claimed in claim 3, wherein an actual physical state of the at least one vehicle occupant is derived from acoustic behavior.

11. The method as claimed in claim 4, wherein an actual physical state of the at least one vehicle occupant is derived from acoustic behavior.

12. The method as claimed in claim 2, wherein a scope or nature of an activation of the at least one continuously activatable system is individually set by respective vehicle users.

13. The method as claimed in claim 3, wherein a scope or nature of an activation of the at least one continuously activatable system is individually set by respective vehicle users.

14. The method as claimed in claim 4, wherein a scope or nature of an activation of the at least one continuously activatable system is individually set by respective vehicle users.

15. The method as claimed in claim 5, wherein a scope or nature of an activation of the at least one continuously activatable system is individually set by respective vehicle users.

16. A vehicle system for influencing a physical state of, or counteracting a detected stress on, at least one vehicle occupant, comprising:
- a plurality of sensors configured to detect data having a relationship to the physical state of the at least one vehicle occupant;
- a plurality of continuously adjustable systems in the vehicle; and
- a health determination and adjustment unit configured to determine the physical state of, or to detect the stress on, the at least one vehicle occupant based on the detected data and, prior to determining a critical physical state of the at least one vehicle occupant that requires a warning or an intervention by a safety device, to determine adjustments to at least one continuously activatable system in the vehicle designed to improve the physical state of, or counteract the stress on, the at least one vehicle occupant.

17. The device as claimed in claim 16, wherein the state of health of the at least one vehicle occupant is determined contactlessly.

18. The device as claimed in claim 16, wherein an actual physical state of the at least one vehicle occupant is determined by a bio-sensor.

19. The device as claimed in claim 16, wherein an actual physical state of the at least one vehicle occupant is derived from events occurring during use of the vehicle or a current traffic situation or a preceding traffic situation.

20. The device as claimed in claim 16, wherein an actual physical state of the at least one vehicle occupant is derived from acoustic data.

21. The method as claimed in claim 1, wherein the at least one continuously activatable system comprises at least one of a passenger compartment heating and cooling system, a passenger compartment air improvement system, a passenger compartment lighting system, a seat massage system, a music system, a chassis and suspension tuning system and an air pressure balancing system.

22. The device as claimed in claim 16, wherein the at least one continuously activatable system comprises at least one of a passenger compartment heating and cooling system, a passenger compartment air improvement system, a passenger compartment lighting system, a seat massage system, a music system, a chassis and suspension tuning system and an air pressure balancing system.

* * * * *